Figure 1:
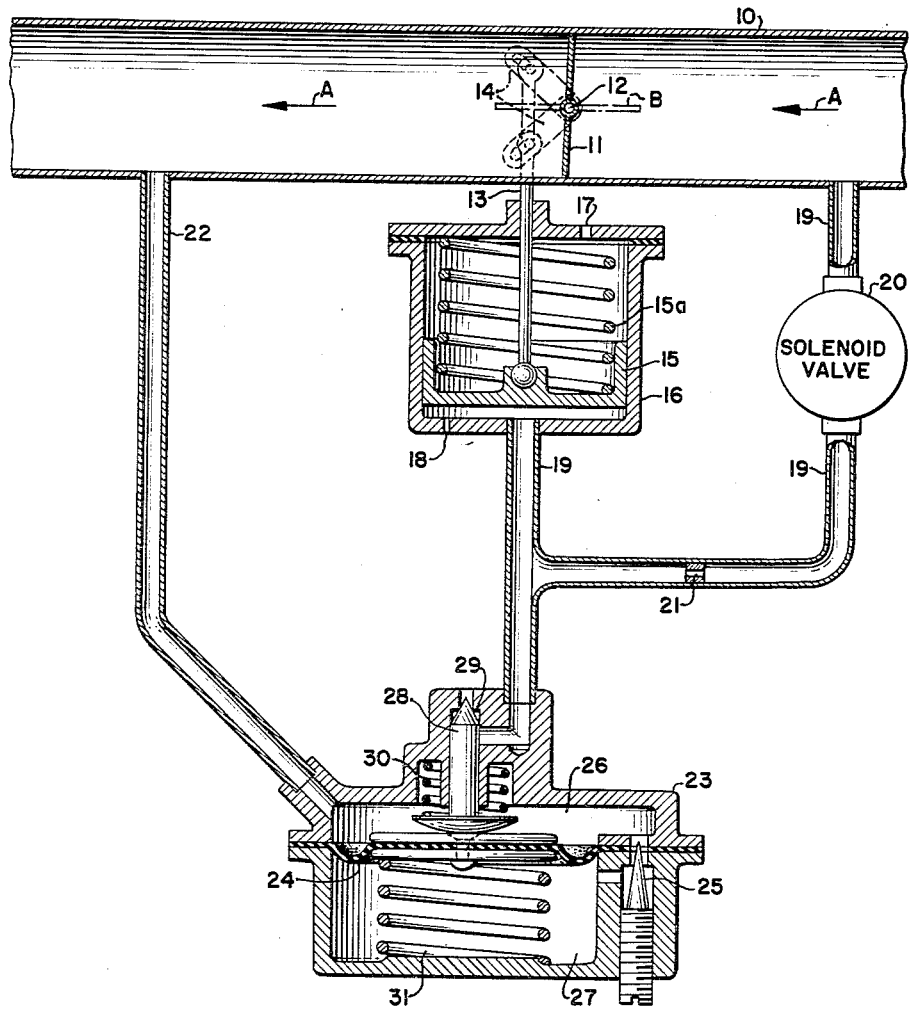

May 31, 1960

A. SILVER ET AL 2,938,537

SHUT-OFF VALVE RATE OF OPERATING CONTROL

Filed June 1, 1953

2 Sheets-Sheet 1

RAYMOND W. JENSEN,
ALEXANDER SILVER,
INVENTORS.

BY John H. J. Wallace

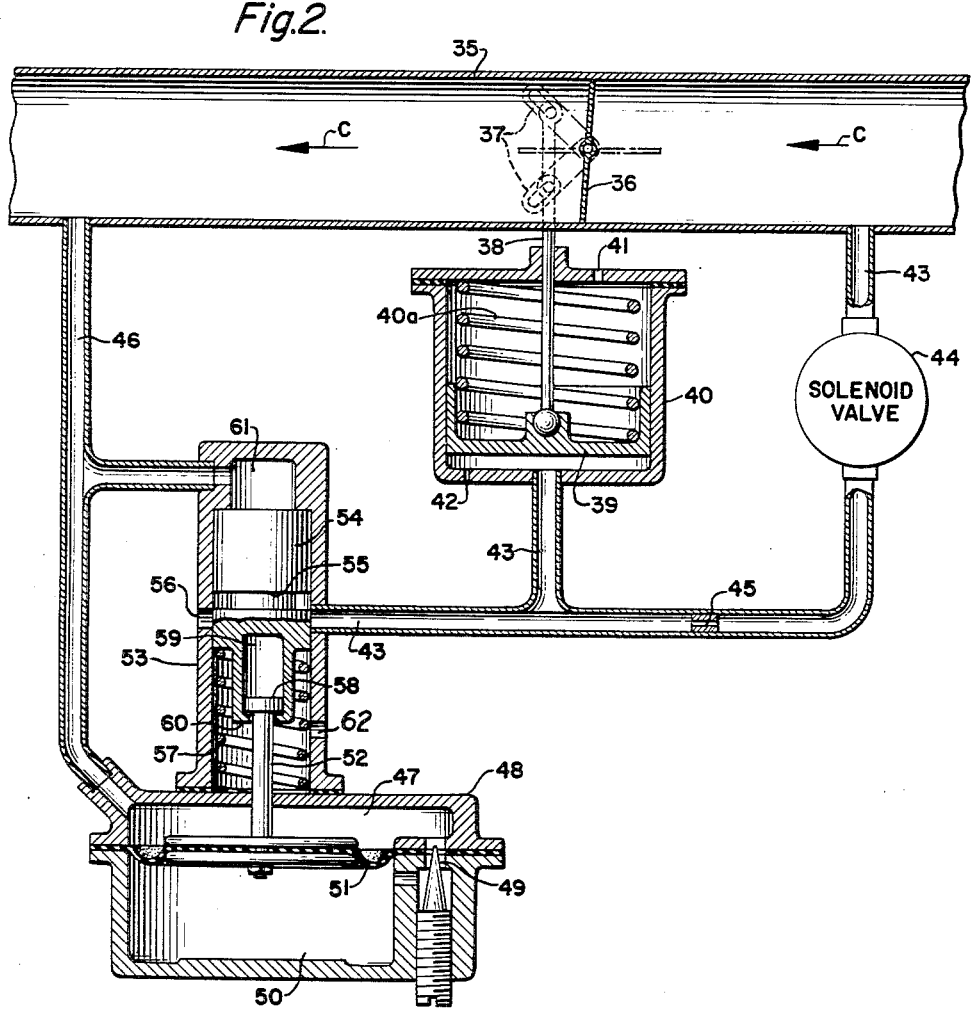

United States Patent Office 2,938,537
Patented May 31, 1960

2,938,537

SHUT-OFF VALVE RATE OF OPERATING CONTROL

Alexander Silver and Raymond W. Jensen, Los Angeles, Calif., assignors to The Garrett Corporation, Los Angeles, Calif., a corporation of California Filed June 1, 1953, Ser. No. 358,924

13 Claims. (Cl. 137—489)

This invention relates to a valve having means for controlling the operating rate thereof.

When supplying compressed air to various devices, it is often desirable to control the pressure of the air and to prevent a rapid pressure increase thereof when delivered to the device. Usually air delivered in a conduit, when controlled by a valve therein, tends to build up pressure very rapidly downstream of the valve when it opens.

When supplying air to air turbine motors, or air turbine engine starters, it is desirable to gradually increase the pressure of air delivered to such equipment, so that the working load of the equipment, may be gradually picked up without undue shock.

In air turbine engine starters the turbine wheel thereof is connected with a reduction gear train which in turn is connected to a clutch which drives the output shaft of the starter. In the event air under high pressure is applied to the turbine, causing it to gain speed rapidly, considerable strain is imposed upon the mechanism of the starter when the clutch engages and places the starter under full load.

It is an object of this invention to provide a valve having means for controlling the operating rate thereof, in order to gradually increase fluid pressure in a conduit downstream from the valve.

Another object of this invention is to provide means for utilizing pressure in a conduit downstream from a valve which controls the flow through the conduit for controlling the rate of opening of the valve.

A further object of the invention is to provide a valve operating rate control mechanism wherein fluid pressure upstream of a valve which controls fluid flow through a conduit actuates the valve and wherein fluid pressure in the conduit downstream of the valve gradually adjusts the fluid pressure actuating the valve, in order to control the rate of opening thereof.

Still another object of the invention is to provide a very simple and reliable means for controlling the opening rate of a valve, which controls the flow of fluid through a conduit, by means of fluid pressure in the conduit downstream from the valve.

Another object of the invention is to provide an arrangement wherein a valve controls the flow of compressed air through a conduit; and in which pneumatic pressure operating the valve is adjusted by a pressure regulator operated by air pressure in the conduit downstream from the valve whereby the operating rate of the valve is controlled and whereby downstream pressure in the conduit is regulated.

Other objects and advantages will appear from the specification and drawings in which:

Fig. 1 is a sectional diagrammatic view of a valve having means for controlling the operating rate thereof, illustrating by dash lines a different position of the valve; and Fig. 2 is a sectional diagrammatic illustration of a valve having a modified means for controlling the operating rate of the valve, and which also regulates pressure downstream therefrom.

As shown in Fig. 1 of the drawings a conduit 10 is adapted to convey compressed air in the direction indicated by arrows A. A butterfly valve 11 is pivoted on its shaft 12 internally of the conduit 10 and may be moved from the fully closed position shown in full lines to the fully open dash line position B. The valve is connected to an actuator rod 13 by means of conventional bell crank linkage 14 disposed outside the conduit 10. Connected to the rod 13 is a piston 15 which is reciprocally mounted in a cylinder 16. A spring 15a bears against one end of the cylinder 16 and the piston 15 and tends to move the piston away from the conduit 10, and downwardly as shown in Fig. 1, to close the valve 11. The valve is therefore substantially fail safe. The cylinder 16 is provided with a vent opening 17 in the upper end and a bleed orifice 18 in its opposite end. Communicating with the interior of the cylinder adjacent the bleed orifice 18 is a supply duct 19. The opposite end of the duct 19 communicates with the interior of the conduit 10 upstream from the valve 11. A valve 20 is a pilot valve preferably of the solenoid type disposed in duct 19 for controlling the flow of air to the actuator cylinder 16 from the conduit 10 upstream of the valve 11. A flow restricting orifice 21 is positioned in the duct 19 between the valve 20 and the cylinder 16. Communicating with the interior of the conduit 10 downstream from the valve 11 is a supply duct 22. The duct 22 communicates with the interior of a rate control mechanism to supply fluid pressure to the interior of casing 23 at one side of a diaphragm 24 therein. A needle valve 25 provides an adjustable restricted orifice communicating with a chamber 26 formed on one side of the diaphragm 24 and with a chamber 27 on the opposite side thereof. A vent valve 28, in the casing 23, is provided with a seat 29 communicating with the duct 19. The vent valve 28 when moved from its seat 29 vents the duct 19 for lowering the pressure therein. A spring 30 is a light spring positioned in the chamber 26 and tends to hold the vent valve 28 open relative to its seat 29 while a spring 31 in the chamber 27 of the casing 23 forces the diaphragm 24 toward the valve 28 normally maintaining it seated on its seat 29 against compression of the light spring 30.

The operation of the valve is substantially as follows:

Compressed air is supplied to the conduit 10 upstream from the normally closed main valve 11. Operation of the valve is initiated by opening the pilot valve 20. Compressed air then travels through the duct 19, valve 20, and orifice 21 to the interior of the actuator casing 16, thereby forcing the piston 15 to move against the force of the spring 15a therein which by means of the linkage 14 causes the main valve to start opening. As soon as the main valve has opened slightly air pressure in the conduit 10 downstream therefrom increases very quickly. The increased pressure downstream from the main valve is transmitted by the duct 22 into the chamber 26 of the rate control casing 23. Immediately the increased pressure in the chamber 26 forces the diaphragm 24 downwardly into the chamber 27 in opposition to the compressive force of the spring 31, thereby permitting the light spring 30 to move the vent valve 28 away from its seat 29. When the vent valve 28 is open it bleeds air from the duct 19, rapidly reducing pressure in the lower portion of the actuator casing 16, which momentarily stops the upward movement of the piston 15. Hence the opening movement of the main valve is temporarily halted until air pressure in the chambers 26 and 27 of the rate control casing 23 begins to equalize by passage of air through the adjustable orifice 25. During the passage of air from the chamber 26 to the chamber 27 the diaphragm moves slowly toward the vent valve 28 gradually closing the same against its seat 29 whereby pressure in the duct 19 and the cylinder 16 is gradually increased again. During this gradual increase of the pressure in the cylinder 16, the piston 15 slowly moves upward, moving the main valve 11 to open position at a corresponding speed. The slow rate of opening of the main valve permits pressure in the conduit 10 downstream of the main valve to increase gradually which prevents adverse effects on various devices which may receive air from the conduit 10 downstream from the main valve.

It will be obvious that during the initial opening of conventional butterfly valves such as the main valve 11 considerable pressure may be required to initiate opening thereof. Therefore full upstream pressure in the conduit 10 is applied to the actuator piston 15 for this purpose. It will be evident however that the pneumatic arrangement of the rate control device, hereinbefore described, very quickly reduces the pressure in the cylinder 16 after the main valve has been opened slightly. This mode of operation permits a sticking of the main valve to be readily overcome without permitting volume flow through the valve before the rate of opening control starts to subsequently gradually increase pressure necessary to open the main valve to its desired capacity flow position. When it is desired to close the main valve the pilot valve 20 is closed which shuts off the supply of compressed air to the duct 19. The pressure in the duct is immediately reduced by slight leakage of compressed air from the cylinder 16 through the orifice 18. The piston 15 then moves toward the orifice 18, which starts the closing movement of the main valve. Immediately downstream pressure in the conduit 10 is reduced which in turn lowers the pressure in the chamber 26 of the rate control casing 23 thereby creating a pressure differential across the diaphragm 24 permitting the spring 31 to close the vent valve 28, whereupon it prevents further venting of compressed air from the conduit 19 and cylinder 16 through the seat 29. The orifice 18 is then the only means permitting air to escape from the cylinder 16 whereby the spring 15a slowly moves the piston 15 in proportion to the gradual escape of air, through the orifice 18, from the cylinder 16. In this manner the closing rate of the main valve is controlled.

In the modified form of the invention shown in Fig. 2 of the drawings a conduit 35 conveys compressed air in the direction of the arrows C while the butterfly main valve 36 is arranged to shut off the flow of compressed air when in the solid line position. The main valve is actuated by linkage 37 disposed outside the conduit 35 and connected with the piston rod 38 linked to the piston 39. A spring 40a engaging the piston 39 tends to maintain the valve 36 in closed position. The piston 39 is reciprocally mounted in the actuator cylinder 40 which is provided with a vent 41 in its upper end and an orifice 42 in its opposite end. Adjacent the orifice 42 and communicating with the interior of the actuator cylinder 40 is the duct 43. The opposite end of the duct 43 communicates with the interior of the conduit 35 upstream from the main valve. The solenoid valve 44 is a pilot valve disposed in the duct 43 and arranged to initiate operation of the main valve. Positioned in the duct 43 between the pilot valve 44 and the actuator cylinder 40 is a flow restricting orifice 45. Communicating with the interior of the conduit 35 downstream from the main valve is the duct 46. The duct 46 communicates with the chamber 47 of the rate control casing 48 in which the adjustable orifice 49 provides a passage to the chamber 50 at the opposite side of the diaphragm 51 from the chamber 47. Connected to the diaphragm 51 is a rod 52 which extends into the pressure regulator casing 53 and engages the piston 54 therein. The piston 54 is reciprocally mounted in the pressure regulator casing and is provided with an annular groove 55 intermediate its end and adapted to communicate with the duct 43 and a vent opening 56 in the pressure regulator casing. The spring 57 tends to maintain the piston 54 in a position so that the annular valve groove 55 does not permit communication between the duct 43 and the vent port 56. The rod 52 connected to the diaphragm 51, is provided with a head 58 reciprocally mounted in the bore 59 of the piston 54. The bore 59 is restricted at its lower end 60 providing an abutment structure for engaging the head 58 of the rod 52 and limiting its movement. The reciprocal arrangement of the head 58 of the rod 52 in the bore 59 permits the piston 54 to move freely in a downward direction in response to fluid pressure entering through the tube 46 into the chamber 61 of the pressure regulator casing 53. It will be obvious therefore that the diaphragm 51 may maintain a certain position in the rate control casing 48 while the piston 54 is free to move with respect to the head 58 of the rod 52. The spring 57 compressively engaging the piston 54 tends to resist movement of the diaphragm 51 toward the chamber 50 due to engagement of the head 58 of the rod 52 with the restricted abutment structure 60 at the end of the bore 59. Opposite movement of the diaphragm 51 toward the chamber 47 merely moves the head 58 of the rod 52 in the bore 59 without causing any force to be applied to the piston 54.

Before the operation of the valve, shown in Fig. 2, can be initiated compressed air must exist at the upstream side of the main valve which is in the closed position as shown. Opening of the main valve is initiated by operation of the pilot valve 44 which admits compressed air from the upstream portion of the conduit 35 to the interior of the actuator cylinder 40 at the lower side of the piston 39. Full pressure of the compressed air against the piston 39 overcomes any sticking tendency of the butterfly main valve causing immediate partial opening thereof. As soon as the main valve is slightly open, pressure increases in the conduit 35 downstream from the valve 36. The increased downstream pressure is transmitted by the duct 46 to the chamber 47 in which the increased pressure acts upon the diaphragm 51 and forces it downward causing the rod 52 by means of the head 58 to force the annular groove 55 of the valve piston 54 into communication with the duct 43 and the vent port 56. Thus pressure in the actuator cylinder 40 is decreased rapidly after the valve 36 has started to open. Compressed air in the chamber 47 gradually passes through the adjustable orifice 49 into the chamber 50 reducing the differential pressure on the diaphragm 51 until pressures at opposite sides of the latter are equalized. If the pressure in passage 46 has decreased or the force thereof on piston 54 is insufficient to resist it, the spring 57 will force the piston 54 upwards toward the chamber 61. The annular groove 55 communicating with the duct 43 and the vent port 56 will be gradually moved upwards by the spring 57 to reduce venting flow through the port 56. Movement of the piston 54 in response to the force of spring 57 is controlled by the gradual bleed of air from the chamber 47 through the orifice 49 and into the chamber 50 which slowly reduces the pressure differential across the diaphragm 51. If, when pressures are equalized at the opposite sides of diaphragm, the fluid pressure in passage 46 is sufficient to resist the force of spring 57, the piston 54 will remain in position to bleed fluid from passage 43 to port 56. Piston 54 may move in response to slowly varying fluid pressure in chamber 61. When pressure has become equalized in the chambers 47 and 50, the piston 54 is permitted to operate as a pressure regulator to control pressure in the conduit 35. It will be noted that the lost motion connection between the diaphragm 51 and piston 54 is provided to permit relative movement between these elements. To this end pressure in the conduit 35 downstream from the valve 36 is conveyed to the chamber 61 of the pressure regulator casing 53 and applied to one end of the piston 54. The other end of this piston is exposed to ambient pressure through an opening 62 in the regulator casing 53. The fluid pressure in chamber 61 tends to move piston 54 in the direction to maintain communication between duct 43 and vent port 56, this movement being resiliently opposed by the spring 57, the rate of which determines the regulated pressure in conduit 35 at the downstream side of the valve 36. When pressure downstream of valve 36 increases the piston 54 is moved against the force of the spring 57 to increase the vent flow of compressed air from the duct 43 outwardly through the vent port 56. Such reduction of pressure in the duct 43 reduces pressure in the cylinder 40 permitting the spring 40a to slightly close the main valve in order to maintain a certain downstream pressure. It will therefore be understood that the operation of the pressure regulating piston 54, in response to downstream pressure, is adapted to control the valve 36 and hence the downstream pressure. When it is desired to close the valve 36 the pilot valve 44 is closed which shuts off the supply of compressed air to the duct 43. The pressure in the duct is immediately reduced by slight leakage of air through the orifice 42 in the cylinder 40. The piston 39 then moves downwardly toward the orifice 42 starting the closing movement of the valve 36. Immediately, downstream pressure in the conduit 35 is reduced, which in turn lowers the pressure in the chamber 47, thereby creating a pressure differential across the diaphragm 51, permitting the spring 57 to force the piston 54 to a position wherein it completely shuts off the flow of air through the vent port 56. The orifice 42 is then the only means permitting air to escape from the cylinder 40 whereby the spring 40a slowly moves the piston 39 downwardly in accordance with the gradual escape of air from the cylinder 40 through the orifice 42. In this manner the closing rate of the main valve is controlled. It will be obvious that the pressure of fluid in the tube 46, irrespective of its source, serves to actuate piston 54 in the performance of the function of regulating the pressure in conduit 35 at the downstream side of valve 36.

Having thus described the invention and the present embodiments thereof, it is desired to emphasize the fact that many further modifications may be resorted to.

We claim:

1. In a valve having means for controlling the operating rate thereof, the combination of, a fluid conduit, a main valve arranged to control fluid flow therethrough, a fluid operated actuator for said main valve, a first fluid duct communicating with said conduit upstream from said main valve, a shut off pilot valve arranged to control fluid flow through said first duct, said actuator having a first fluid pressure responsive means communicating with said first duct and connected with said main valve, a spring tending to oppose the fluid pressure force imposed upon said first pressure responsive means, a second duct communicating with said conduit downstream from said main valve, a casing communicating with said second duct, a second fluid pressure responsive means in said casing, said second pressure responsive means and said casing defining opposed chambers, a bleed valve interconnecting said opposed chambers, a vent valve communicating with said first duct for venting it downstream from said pilot valve and arranged to be operated by said second pressure responsive means, and a spring tending to move said second pressure responsive means in opposition to pressure of fluid entering said casing and tending to close said vent valve.

2. In a valve having means for controlling the operating rate thereof, the combination of, a fluid conduit, a main valve arranged to control fluid flow therethrough, a fluid operated actuator for said main valve, a first fluid duct communicating with said conduit upstream from said main valve, a shut off pilot valve arranged to control fluid flow through said first duct, said actuator having a first fluid pressure responsive means communicating with said first duct and connected with said main valve, a spring tending to oppose the fluid pressure force imposed upon said first pressure responsive means, a second duct communicating with said conduit downstream from said main valve, a casing communicating with said second duct, a second fluid pressure responsive means in said casing, said second pressure responsive means and said casing defining opposed chambers, a bleed valve interconnecting said opposed chambers, a vent valve communicating with said first duct for venting it downstream from said pilot valve and arranged to be operated by said second pressure responsive means, a spring tending to move said second pressure responsive means in opposition to pressure of fluid entering said casing and tending to close said vent valve, and a restricted orifice means in said first duct between said pilot valve and said bleed valve.

3. In a valve having means for controlling the operating rate thereof, the combination of, a fluid conduit, a main valve arranged to control fluid flow therethrough, a fluid operated actuator for said main valve, a first fluid duct communicating with said conduit upstream from said main valve, a shut off pilot valve arranged to control fluid flow through said first duct, said actuator having a first fluid pressure responsive means communicating with said first duct and connected with said main valve, a spring tending to oppose the fluid pressure force imposed upon said first pressure responsive means, a second duct communicating with said conduit downstream from said main valve, a casing communicating with said second duct, a second fluid pressure responsive means in said casing, said second pressure responsive means and said casing defining opposed chambers, a bleed valve interconnecting said opposed chambers, a vent valve communicating with said first duct for venting it downstream from said pilot valve and arranged to be operated by said second pressure responsive means, a spring tending to move said second pressure responsive means in opposition to pressure of fluid entering said casing and tending to close said vent valve, and another spring tending to open said vent valve.

4. In a valve having means for controlling the operating rate thereof, the combination of, a fluid conduit, a main valve arranged to control fluid flow therethrough, a fluid operated actuator for said main valve, a first fluid duct communicating with said conduit upstream from said main valve, a shut off pilot valve arranged to control fluid flow through said first duct, said actuator having a first fluid pressure responsive means communicating with said first duct and connected with said main valve, a spring tending to oppose the fluid pressure force imposed upon said first pressure responsive means, a second duct communicating with said conduit downstream from said main valve, a casing communicating with said second duct, a second fluid pressure responsive means in said casing, said second pressure responsive means and said casing defining opposed chambers, a bleed valve interconnecting said opposed chambers, a vent valve communicating with said first duct for venting it downstream from said pilot valve and arranged to be operated by said second pressure responsive means, and a spring tending to move said second pressure responsive means in opposition to pressure of fluid entering said casing and tending to close said vent valve, said bleed valve being adjustable.

5. In a valve having means for controlling the operating rate thereof, the combination of, a fluid conduit, a main valve arranged to control fluid flow therethrough, a fluid operated actuator for said main valve, a first fluid duct communicating with said conduit upstream from said main valve, a shut off pilot valve arranged to control fluid flow through said first duct, said actuator having a first fluid pressure responsive means communicating with said first duct and connected with said main valve, a spring tending to oppose the fluid pressure force imposed upon said first pressure responsive means, a second duct communicating with said conduit downstream from said main valve, a casing communicating with said second duct, a second fluid pressure responsive means in said casing, said second pressure responsive means and said casing defining opposed chambers, a bleed valve interconnecting said opposed chambers, a vent valve communicating with said first duct for venting it downstream from said pilot valve and arranged to be operated by said second pressure responsive means, and a spring tending to move said second pressure responsive means in opposition to pressure of fluid entering said casing and tending to close said vent valve, said vent valve being normally closed.

6. In a valve having means for controlling the operating rate thereof, the combination of, a fluid conduit, a main valve arranged to control fluid flow therethrough, a fluid operated actuator for said main valve, a first fluid duct communicating with said conduit upstream from said main valve, an orifice disposed to restrict fluid flow through said first duct, said actuator having a first fluid pressure responsive means communicating with said first duct downstream from said orifice, said actuator being operatively connected with said main valve, a spring tending to oppose the fluid pressure force imposed upon said first pressure responsive means, a second duct communicating with said conduit downstream from said main valve, a casing communicating with said second duct, a second fluid pressure responsive means in said casing, said second pressure responsive means and said casing defining opposed chambers, a bleed valve interconnecting said opposed chambers, a vent valve communicating with said first duct for venting it downstream from said orifice, said vent valve being operable by said second pressure responsive means, a spring tending to move said second pressure responsive means in opposition to pressure of fluid entering said casing and tending to operate said vent valve, said vent valve having third pressure responsive means communicating with said second duct and arranged to opposed said last mentioned spring whereby said vent valve is adapted to respond to the pressure downstream from the main valve in said second duct for regulating said downstream pressure in said conduit by modifying the pressure on the actuator of said main valve.

7. In a valve having means for controlling the operating rate thereof, the combination of, a fluid conduit, a main valve arranged to control fluid flow through said conduit, a first duct communicating with the interior of said conduit upstream from said main valve, a pilot valve arranged to control fluid flow through said first duct, an orifice in said first duct, a main valve actuator operatively connected with said main valve and communicating with said first duct, said actuator being responsive to fluid pressure in said first duct downstream from said orifice and tending to operate said main valve in response to fluid pressure in said first duct, means tending to oppose the force of fluid tending to operate said main valve, a vent valve communicating with said first duct downstream from said orifice, a second duct communicating with said conduit downstream from said main valve, second means responsive to fluid pressure in said second duct to operate said vent valve, orifice means for controlling the rate of pressure increase on said second pressure responsive means, whereby the rate of fluid pressure increase in said actuator is controlled by the rate at which said vent valve operates, a spring tending to close said vent valve, and third pressure responsive means operably connected with second means and opposed to said spring, said third means communicating with said second duct for operating said vent valve in response to pressure in said second duct thereby modifying pressure in said first duct and said actuator relative to pressure in said conduit downstream from said main valve.

8. In a valve having means for controlling the operating rate thereof, a fluid conduit, a main valve disposed to control the flow of fluid through said conduit, a first means communicating with, and responsive to, fluid pressure in said conduit upstream of said main valve and disposed to actuate said main valve, an orifice for limiting flow from said conduit to said first means; second means communicating with, and responsive to, the fluid pressure in said conduit downstream from said main valve; a vent valve operable by said second means, said vent valve communicating with said first means downstream of said orifice, for controlling the operating speed of said first means by venting fluid from said first means downstream from said orifice, said second means having first and second surfaces responsive to pressure downstream of said main valve to move said vent valve in the same direction, said second pressure responsive surface being connected with said first pressure responsive surface of said second means by a lost motion means, whereby said main valve is controlled by both surfaces at certain times and by one surface at other times to maintain said downstream pressure within a predetermined range.

9. In an actuator the combination of: a first fluid pressure responsive means; restricted orifice means disposed to deliver fluid under pressure to said first fluid pressure responsive means; a variable capacity vent valve communicating with said first fluid pressure responsive means for venting fluid pressure therefrom; a second fluid pressure responsive means in motion transmitting engagement with said vent valve, said second fluid pressure responsive means having opposed surfaces and serving to actuate said vent valve; means forming first and second chambers disposed to contain oppositely acting fluid pressures and communicating with said opposed surfaces; a restricted bleed valve intercommunicating with said first and second chambers, and disposed to equalize said oppositely acting fluid pressures at a controlled rate; passage means for conducting a control fluid under pressure into one of said chambers; and a third fluid pressure responsive means in motion transmitting relation with said vent valve, said third fluid pressure responsive means communicating with said passage means and serving to operate said vent valve without assistance by said second fluid pressure responsive means to modulate the pressure acting on said first fluid pressure responsive means at predetermined times.

10. In an actuator the combination of: a first fluid pressure responsive means; restricted orifice means disposed to deliver fluid under pressure to said first fluid pressure responsive means; a variable capacity vent valve communicating with said first fluid pressure responsive means for venting fluid pressure therefrom; a second fluid pressure responsive means in motion transmitting engagement with said vent valve, said second fluid pressure responsive means having opposed surfaces and serving to actuate said vent valve; means forming first and second chambers disposed to contain oppositely acting fluid pressures communicating with said opposed surfaces; a restricted bleed valve for allowing communication between said first and second chambers, and disposed to equalize said oppositely acting fluid pressures at a controlled rate; passage means for conducting a control fluid under pressure into one of said chambers; third fluid pressure responsive means in motion transmitting relation with said vent valve, said third fluid pressure responsive means communicating with pressure in said passage means and serving to operate said vent valve without assistance by said second fluid pressure responsive means to modulate the pressure acting on said first fluid pressure responsive means at predetermined times; and resilient means tending to oppose the pressure acting on said third fluid pressure responsive means.

11. In an actuator of the type having a first fluid pressure responsive means: means for regulating the fluid pressure applied to said first fluid pressure responsive means, said regulating means having a valve housing communicating with said first fluid pressure responsive means, said valve housing having an inlet and an outlet; a valve element disposed in said housing for movement to control communication between said inlet and outlet and the consequent application of fluid pressure to said first fluid pressure responsive means; means applying a reference force to said valve element to move the same in one direction in said housing; actuating means for said valve element having a second fluid pressure responsive means operatively connected with said valve element; passage means for conducting fluid under pressure to said second fluid pressure responsive means to apply a pressure differential thereto to move said valve element in opposition to said reference force; means for dissipating said pressure differential at a predetermined rate; a third pressure responsive means operatively connected with said valve element; and passage means for applying a variable signal pressure to said third pressure responsive means, said signal pressure tending to resist movement of said valve element by said reference force when said pressure differential has been dissipated.

12. In an actuator of the type having a first fluid pressure responsive means: means for regulating the fluid pressure applied to said first fluid pressure responsive means, said regulating means having a valve housing communicating with said first fluid pressure responsive means, said valve housing having an inlet and an outlet; a valve element disposed in said housing for movement to control communication between said inlet and outlet and the consequent application of fluid pressure to said first fluid pressure responsive means; means applying a reference force to said valve element to move the same in one direction in said housing; actuating means for said valve element having a second fluid pressure responsive means of predetermined area operatively connected with said valve element; passage means for conducting fluid under pressure to said second fluid pressure responsive means to apply a pressure differential thereto to move said valve element in opposition to said reference force; means for dissipating said pressure differential at a predetermined rate; a third pressure responsive means of an area less than that of said second pressure responsive means operatively connected with said valve element; and passage means for applying a variable signal pressure to said third pressure responsive means, said signal pressure tending to resist movement of said valve element by said reference force when said pressure differential has been dissipated.

13. In an actuator of the type having a first fluid pressure responsive means: means for regulating the fluid pressure applied to said first fluid pressure responsive means, said regulating means having a valve housing with an inlet communicating with said first fluid pressure responsive means and an exhaust outlet; a spool valve disposed in said housing for movement to control communication between said inlet and outlet and the application of fluid pressure to said first fluid pressure responsive means; spring means applying a reference force to said spool valve to move the same in one direction in said housing; actuating means for said spool valve having a second fluid pressure responsive means of predetermined area; means establishing a one-way motion transmitting connection between said second fluid pressure responsive means and said spool valve; passage means for conducting fluid under pressure to said second fluid pressure responsive means to apply a pressure differential thereto to move said spool valve in opposition to said reference force; means for dissipating said pressure differential at a predetermined rate; a third pressure responsive means of an area less than that of said second pressure responsive means, said third pressure responsive means being operatively connected with said spool valve and responsive to fluid pressure to move said piston valve in opposition to said reference force; and passage means for applying a variable signal pressure to said third pressure responsive means, said signal pressure tending to resist movement of said spool valve by said reference force when said pressure differential has been dissipated.

References Cited in the file of this patent

UNITED STATES PATENTS

| Number | Name | Date |
|---|---|---|
| 843,174 | Reynolds | Feb. 5, 1907 |
| 1,228,104 | Fulton | May 29, 1917 |
| 1,311,536 | Smoot | July 29, 1919 |
| 1,623,444 | Sjoo | Apr. 5, 1927 |
| 1,711,066 | Smoot | Apr. 30, 1929 |
| 2,005,773 | DeFlorez | June 25, 1935 |
| 2,158,068 | Grove | May 16, 1939 |
| 2,196,279 | Thomas | Apr. 9, 1940 |
| 2,307,314 | Willson | Jan. 5, 1943 |
| 2,354,423 | Rosenberger | July 25, 1944 |
| 2,370,110 | Spence | Feb. 20, 1945 |
| 2,374,708 | Shoults | May 1, 1945 |